United States Patent
Rylewski

[19]

[11] Patent Number: 6,109,258
[45] Date of Patent: Aug. 29, 2000

[54] DEVICE FOR CAPTURING SOLAR ENERGY AND TRANSFERRING IT ONTO A RECEIVING MEDIUM TO BE HEATED

[76] Inventor: Eugeniusz Rylewski, 43bis, avenue du Général Leclerc, F 78470 Saint Remy les Chevreuse, France

[21] Appl. No.: 09/308,270

[22] PCT Filed: Dec. 1, 1997

[86] PCT No.: PCT/FR97/02169

§ 371 Date: May 17, 1999

§ 102(e) Date: May 17, 1999

[87] PCT Pub. No.: WO98/25088

PCT Pub. Date: Jun. 11, 1998

[30] Foreign Application Priority Data

Dec. 3, 1996 [FR] France ................................. 96 14809

[51] Int. Cl.[7] .................................................. F24J 2/00
[52] U.S. Cl. ...................... 126/702; 126/649; 126/650; 126/624
[58] Field of Search .................... 126/702, 701, 126/703, 648, 649, 650, 652, 624, 633, 634, 651, 658, 704, 712, 710

[56] References Cited

U.S. PATENT DOCUMENTS

| | | | |
|---|---|---|---|
| 4,034,736 | 7/1977 | Telkes | 126/647 |
| 4,046,135 | 9/1977 | Root et al. | 126/650 |
| 4,085,999 | 4/1978 | Chahroudi | 126/701 |
| 4,088,117 | 5/1978 | Keyes | 126/658 |
| 4,207,869 | 6/1980 | Hart | 126/648 |
| 4,262,657 | 4/1981 | McCullough et al. | 126/649 |
| 4,716,882 | 1/1988 | Ishida | 126/650 |
| 5,497,762 | 3/1996 | Rylewski | 126/702 |
| 5,657,745 | 8/1997 | Damminger | 126/649 |
| 5,931,157 | 8/1999 | Aschauer | 126/648 |

FOREIGN PATENT DOCUMENTS

| | | |
|---|---|---|
| 83425/75 | 3/1977 | Australia . |
| 0 564 357 A1 | 10/1993 | European Pat. Off. . |
| 0 692 685 A2 | 1/1996 | European Pat. Off. . |
| 2346648 | 10/1977 | France . |
| 26 46 262 | 4/1978 | Germany . |

*Primary Examiner*—Carl D. Price
*Assistant Examiner*—Josiah C. Cocks
*Attorney, Agent, or Firm*—Staas & Halsey

[57] ABSTRACT

The invention concerns a device for capturing solar energy and transferring it onto a receiving medium to be heated. The device comprises a multiplicity of blades (16), mutually spaced and tiered up to form a screen (10) with an external surface (18) for exposure to the sun radiation and an internal surface (20) for being arranged on the side of the receiving medium (12), the blades defining between them a multiplicity of air channels (22) extending from the external surface (18) to the internal surface (20), closing means being provided for immobilizing the air contained in the channels, the blades being transparent or translucent, with low capacity for absorbing the sun radiation and low thermal conductivity, being made from a lap of thin material, and having an outline with an end part bordering the internal surface of the screen.

20 Claims, 6 Drawing Sheets

DEVICE FOR CAPTURING SOLAR ENERGY AND TRANSFERRING IT ONTO A RECEIVING MEDIUM TO BE HEATED

BACKGROUND AND SUMMARY OF THE INVENTION

The invention relates to a device for collecting solar energy and transferring it to a receiving medium to be heated.

There is already known from French patent No. 92 03962 a device of this type which comprises a multiplicity of substantially horizontal profiled elements spaced from one another and arranged in tiers to form a screen having an external face designed to be exposed to solar radiation and an internal face designed to be mounted against the receiving medium, the profiled elements defining between them a multiplicity of air channels extending between the external face and the internal face, closure means being provided to trap the air contained in the channels.

The profiled elements allow the solar energy to be collected and to be conducted towards the internal face of the screen situated adjacent to the receiving medium which could, for example, be an outside wall of a building or a volume of air inside a building. It also achieves heating of the air contained in the channels defined between the profiled elements.

The principal aim of the invention is to simplify the structure of these profiled elements while at the same time allowing the achievement of improved thermal performance compared with that obtained by the collecting device known from the above-mentioned French patent.

With this in mind there is proposed according to the invention a collecting device of the type defined above in which the profiled elements take the form of transparent or translucent strips having the properties of low absorption of solar radiation and of low thermal conduction, the said strips being made from a sheet of thin material and a having a profile which has a rising terminal portion adjacent to the internal face of the screen.

The term "screen" is used in its general sense to designate the assembly formed by the tiered strips which constitute a kind of perforated panel. This term should not be interpreted in its narrow sense as designating a piece of furniture fabric or the like.

By virtue of the fact that the strips of the screen are transparent or translucent and not essentially reflecting as in the above mentioned French patent there is obtained an improved capture of the solar energy, the light captured being able to reach as far as the internal face of the screen, that is to say to the receiving medium to be heated.

Moreover the capture is improved by virtue of the fact that the strips have a low absorption of solar radiation and a low thermal conduction, thereby limiting the loss of energy.

The expression "low thermal conduction" is intended to include also the case where the strips are non-conducting of heat.

As the strips are formed by taking a film of thin material they can be supported by a lightweight structure.

Ideally the material of which the strips are formed is a non-conductor of heat. In fact it is important that the strips should be non-conducting in the direction of penetration of the solar energy, that is to say from the external face towards the internal face of the screen.

The strips are preferably formed of a woven or non-woven material based on mineral or synthetic fibers, in particular glass fibers, the material having good transparency and low retention of the radiated energy.

The material from which the strips are formed could, where appropriate, be impregnated with a substance designed to improve their characteristics of sealing, transparency, brilliance, reflection, rigidity or durability.

In a first general embodiment of the invention the strips have a generally rectilinear profile arranged inclined to the horizontal in such a way that the air channels are directed to rise from the external face to the internal face of the screen.

This particular configuration facilitates the rise of the warm air contained in the channels towards the internal face of the screen.

In a second general embodiment of the invention the strips have a generally V-shaped profile such that the channels present successively a descending portion and a rising portion from the external face to the internal face of the screen.

This particular profile in the form of a V gives the following advantages in particular.

First of all the incident solar radiation can penetrate into the thickness of the screen while passing less through the strips, such as to allow the receiving medium to be able to absorb a large part of the incident solar radiation.

The angle of the strips on entry (external face of the screen) determines the angle of incidence of the solar radiation which is favoured. It will be adapted to the climate and to the latitude of the situation and possibly also to the orientation of the facade where the device is to be mounted.

Moreover the internal face and the external face of the screen do not mutually "see" each other because they are separated by the V-shaped strips which allow one to obtain good insulation from radiation.

Finally, the structure of the strips in the form of a V permits their rigidity to be increased.

In a third general embodiment of the invention the device has strips of generally rectilinear profile and strips of generally V-shaped profile.

According to another feature of the invention the strips are arranged next to one another in such a way as to provide a reduced gap which is at least five times smaller than the thickness (depth) of the screen between its external face and its internal face. This allows the provision of air channels having a reduced height in comparison with their depth and limits the movement of air by convection. Preferably the gap between two consecutive strips amounts to between 6 and 20 mm for a screen having a thickness of between 6 and 20 cm.

According to another feature of the invention the strips are separate from one another and are joined together by suspension means arranged at intervals adjacent to the external face and adjacent to the internal face of the screen.

In one embodiment of the invention these suspension means comprises a plurality of vertical threads each provided with loops resulting in pairs of gaps corresponding to the gap between the strips, the said loops serving as a means for attaching the strips.

In a preferential manner there is associated with each vertical thread having loops a vertical warp thread which passes successively through the strips and which passes successively through the loops in such a way as to allow the formation of a connection between the strips and the looped thread with which it is associated.

In another embodiment of the invention each of the strips has two series of spaced loops formed respectively at the two longitudinal edges of the strip, the loops of one strip passing through the loops of the strip situated immediately below.

Thus the securing of the strips to one another is effected by co-operation of the loops of two adjacent strips.

The strips, instead of being separate from one another, could be formed by folding a fabric of thin material in an accordion or zigzag fashion, suspension means then being arranged at intervals adjacent to the external face and the internal face of the screen.

In another embodiment of the invention the V-profile strips are separated by spacers in the form of pegs arranged alternately with the strips, in the region of the crest of the V profile, the device having suspension means arranged at intervals and traversing alternately the strips and the spacers.

In a variant the spacers could be situated at the lateral ends of the strips and provide lateral closing of the spaces between the strips. In this case the spacers could be made of different materials such as for example plastics material, agglomerated mineral fibers, etc.

In the embodiments described above, the suspension means comprise at least in part a rigid or flexible thread of a material chosen from amongst metal, a plastics material or even glass.

In another embodiment the strips are held at intervals by two securing elements in the form of combs or of crenellations having regularly spaced teeth, these elements been introduced into the transverse gaps between the strips in such a way that their teeth extend in opposite directions and being capable of being adjusted transversely and longitudinally to alter the orientation of the strips.

According to another feature of the invention the closure means of the screen are provided adjacent to the internal face and/or the external face of the screen.

The closure means situated adjacent to the internal face of the screen could comprise a base plate applied in contact with or spaced from a wall.

This base plate could be formed by a plate made of sheet metal, for example of copper, of aluminium or of galvanised iron.

It could also be a metal sheet with a selective surface, or even a metal film with a selective surface, which is stuck on to a support, in principle a mineral-based support.

One could even use a mineral-based plate possibly provided with a coating which favours the absorption of solar radiation.

The examples of materials suitable for forming this plate are solid glass, woven or non-woven glass fibers, agglomerated wood connected to plaster or to cement, a material based on calcium silicate, etc.

In the case where the plate is provided with a coating which favours the absorption of solar radiation one preferably uses a selective surface which absorbs solar radiation well, but which emits little in the infra-red, in order to achieve better insulation.

The closure means situated adjacent to the external face of the screen could be constituted for example by a plate of glass or of plastics material or of glass cloth, possibly coated to ensure better transparency, better sealing and/or better resistance to the weather.

The receiving medium to which the device according to the invention is applied is generally the outside wall of a building, a volume of air inside a building, or even a heat exchange fluid circulating in channels situated along a wall of a building.

In the description which follows by way of example reference is made to the accompanying drawings, in which.

BRIEF DESCRIPTION OF THE DRAWINGS

DESCRIPTION OF THE PREFERRED EMBODIMENTS

Figure 1:
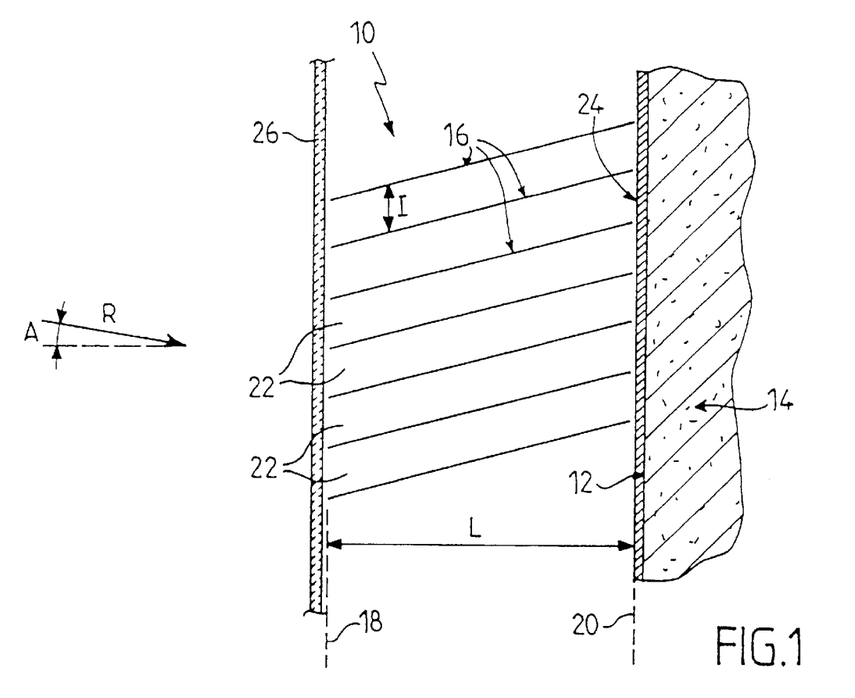
FIG. 1 is a transversely sectioned partial view of a device according to the invention used as an external screen applied against a receiving medium.

Reference is first made to FIG. 1 which shows the solar collecting device 10 according to the invention, applied against a receiving medium which, in this example, is formed by the outside surface 12 of a vertical wall 14 of a building.

The solar collecting device 10 comprises a multiplicity of identical substantially horizontal profiled elements 16 spaced apart from one another and arranged in a tier in a vertical plane.

These profiled elements 16, referred to below as "strips", form a screen or curtain having an external face 18 designed to be exposed to solar radiation R and an internal face 20 designed to be placed adjacent to the receiving surface.

In the example the strips 16 have a rectilinear profile. They are transparent or translucent and have the properties of low absorption of solar radiation and of low thermal conduction. They are obtained by taking a film of thin material which is furthermore thermally insulating, that is to say a non-conductor of heat.

The strips 16 are arranged next to one another in such a way as to result in a gap I of reduced value which is at least five times smaller than the thickness L of the screen, as defined between its external face 18 and its internal face 20.

In the example shown, the spacing I between two consecutive strips 16 amounts to between 10 and 15 mm for a thickness of the screen of between 8 and 20 cm.

The profile of the strips is inclined with respect to the horizontal in such a way that all of the profile and anyway that comprising its end portion adjacent to the internal face 20 of the screen, should be rising.

The strips 16 define between them a multiplicity of air channels 22 which are directed to rise from the external face 18 to the internal face 20 of the screen.

The device of FIG. 1 furthermore has closure means 24 provided adjacent to the internal face of the screen. In the example these closure means 24 are formed by a base plate.

The base plate could comprise a plate of sheet metal, for example of copper, aluminium or galvanised iron.

In a variant one could make use of a metal sheet having a selective surface, that is to say a sheet which has been subjected to a selective treatment to produce a good solar absorption and reduced emission in the infra-red region.

Where appropriate, this sheet could be stuck on to a support, in principle one with a mineral base, for example a calcium silicate base.

It could in fact be in the form of a plate with a mineral base, possibly provided with a coating which favours the absorption of solar radiation. This coating could for example be constituted by a selective paint which has a low emission in the infra-red region in order to achieve better insulation.

Equally, the device has other means closure means situated adjacent to the external face 18 of the screen. In the example these closure means are constituted by a transparent plate 26 of glass or a plastics material, or even by a translucent fabric designed to allow the solar radiation R to pass.

It is equally possible to envisage using as the closure means situated adjacent to the external face of the screen an opaque wall such as for example a painted sheet.

In a variant it is possible to leave the external face 18 completely open or even to provide it with a grille for protection against impacts where this face is exposed to the exterior.

Such a grille also has the function of ensuring solar protection, in particular in summer. It could be constructed in such a way that there is a maximum of solar energy penetrating in winter and a minimum penetrating in summer. This could be valuable for all orientations of walls (South, East, West, etc).

It will be observed that the said grille could be applied equally well in the case where the external face 18 is open as in the case where it is closed by a plate 26 of glass or other material.

The closure means 24 and 26 allow trapping of air contained in the channels 22. The transparent or translucent strips 16 allow the light (solar radiation R) to reach the internal face 20 of the screen, that is to say to reach the wall 14 which constitutes the receiving medium to be heated.

By virtue of the fact that the strips are transparent or translucent and that they have a reduced absorption, the result is a better capture of the solar energy.

The solar energy thus captured is propagated from the external face 18 towards the internal face 20 of the screen following the rising path of the channels 22. Because of the reduced spacing of the strips 16 there is obtained a reduction in the movement of the air by convection.

Furthermore because the strips are formed of a thermally insulating material and the channels are each closed at least at one end improved properties of heat retention are obtained.

Thus the greater part of the solar radiation of short wavelength reaching the internal face 20 is transformed into heat radiation of greater wavelength which then cannot escape as this internal face 20 is closed.

The air heated by the solar radiation is trapped adjacent to the internal face 20 of the screen and thus achieves heating of the receiving surface 12 while forming an insulator which prevents rapid cooling of the receiving surface 12 when the device 10 is not receiving any solar radiation.

The particular orientation of the strips 16 is chosen as a function in particular of the geographical latitude of the place where the device is to be installed, taking account of the angle of inclination A of the solar radiation R with respect to the horizontal.

One can thus arrange to ensure heating of the receiving surface 12 solely in the winter period when the angle A is below a predetermined threshold and to prevent heating in the summer period when the angle A is above a predetermined threshold.

Figure 2:
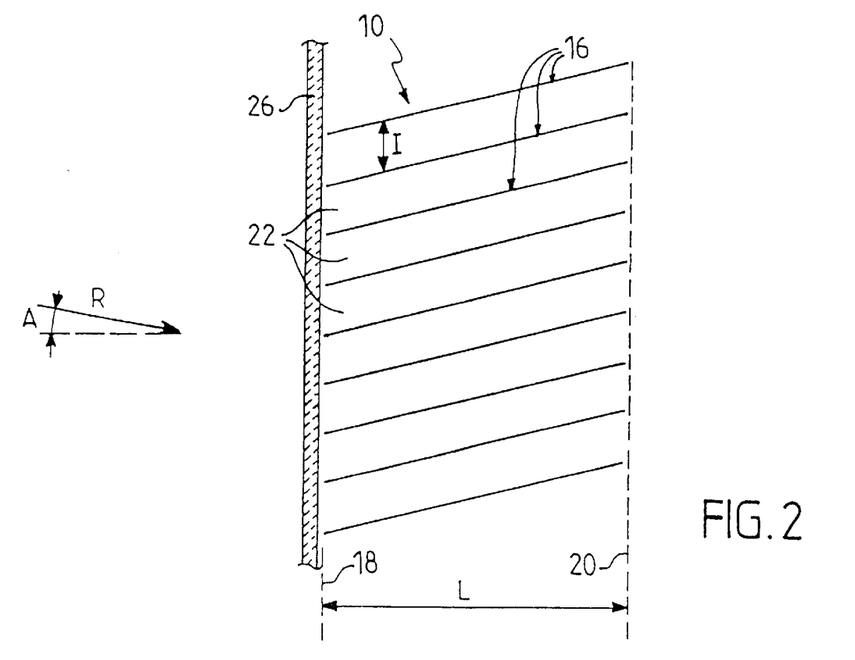
FIG. 2 is a transversely sectioned partial view of another device according to the invention used as an internal screen arranged behind a window of a building.

In the embodiment of FIG. 2, to which reference is now made, the solar collecting device 10 is again formed of a multiplicity of blades 16 analogous to those of FIG. 1.

However, in this example, the strips 16 are arranged inside the building, behind the window 26. The result is that the channels 22 are closed solely adjacent to the external face 18 by the glass 26 and open adjacent to the internal face 20. As indicated earlier, the strips are formed by taking a film of thin material, transparent or translucent.

Figure 3:
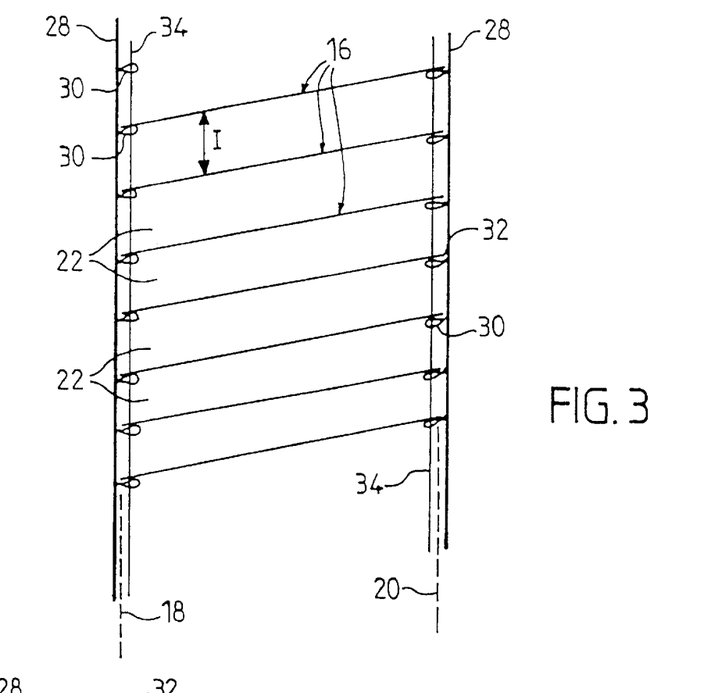
FIG. 3 is a transversely sectioned partial view of a device according to the invention formed using separate strips.
Figures 4, 5:
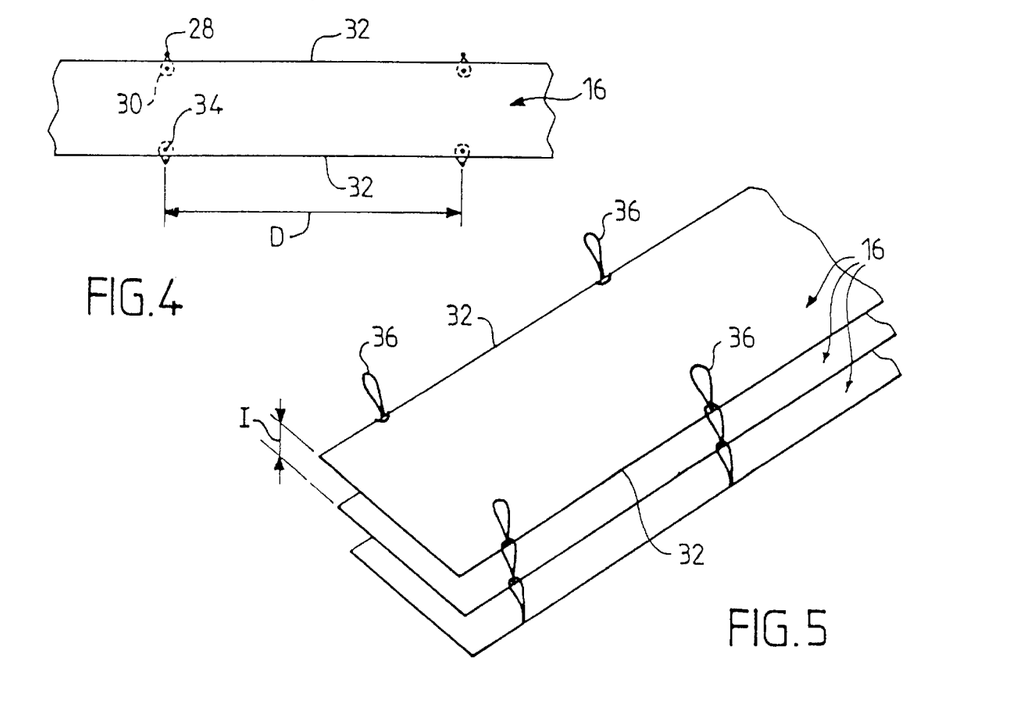
FIG. 4 is a partial view from above of a strip in the device of FIG. 3.
FIG. 5 is a partial perspective view of another device according to the invention, obtained using separate strips.

In the embodiment of FIGS. 3 and 4 the strips 16 are separate from one another and are joined together by suspension means comprising suspension threads 28 arranged at intervals, for example at a distance D of 50 cm (FIG. 4), both adjacent to the external face 18 and adjacent to the internal face 20 of the screen. The threads 28 are arranged vertically and are provided with spaced loops 30 defining between them a spacing I corresponding to the spacing of the strips. Each of the threads 28 could be formed using an appropriate material such as a metal, a plastics material or even a glass. The loops could be formed in any suitable manner. Each of the loops 30 is designed to support a strip 16 along one of its two longitudinal edges 32.

To ensure fixing, the device furthermore has vertical warp threads 34 made of the same material as the threads 28 or of a different material. Each of the threads 34 passes through the thickness of the strips 16 along a longitudinal edge 32 and passes successively through the loops 30, as can be seen in FIG. 3. Thus the strips 16 come to rest on the loops 30 and are joined to these loops by the warp threads 34.

In the embodiment of FIG. 5, to which we now refer, each of the strips 16 has loops 36 formed at intervals, each starting from two longitudinal edges 32 of the strip. These loops 36, when they are stretched out, have a height corresponding to the spacing I chosen between the strips 16.

As can be seen, the loops 36 of one strip pass through the loops of a strip situated immediately below and thus in such a way as to allow attachment from one to the next.

Figure 6:
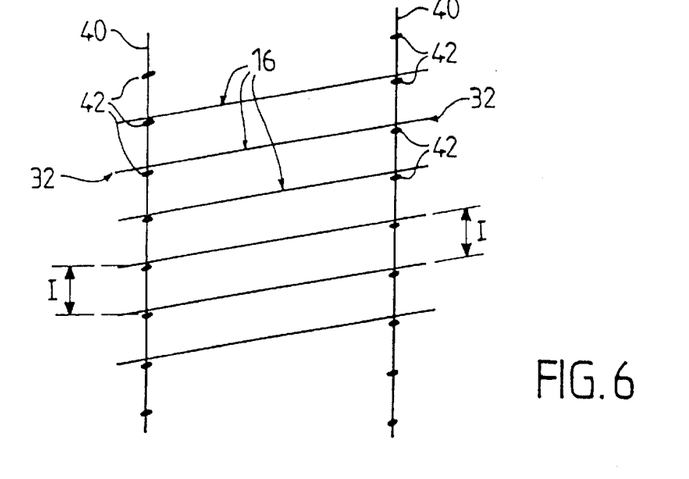
FIG. 6 is a transversely sectioned partial view of another device according to the invention, formed using separate strips.
Figure 7:
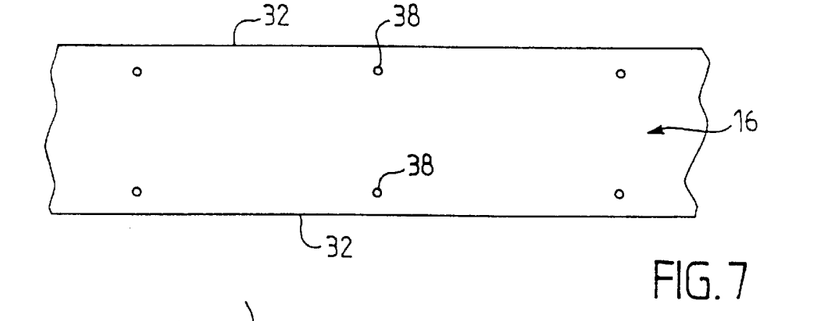
FIG. 7 is a partial view from above of a strip in the device of FIG. 6.

In the embodiment of FIGS. 6 and 7, to which reference is now made, the strips 16 are again independent of one another and preferably formed of a material of a non-woven type having a series of holes or perforations 38 provided respectively next to the two longitudinal edges 32 (FIG. 7). The strips are held by suspension threads 40 spaced from one another and situated adjacent to the external face and the internal face of the screen, the threads 40 being designed to pass through the perforations 38. To hold the strips 16 the suspension threads 40 have regularly spaced knots 42, the height between the knots corresponding to the spacing I chosen for the strips.

Figure 8:
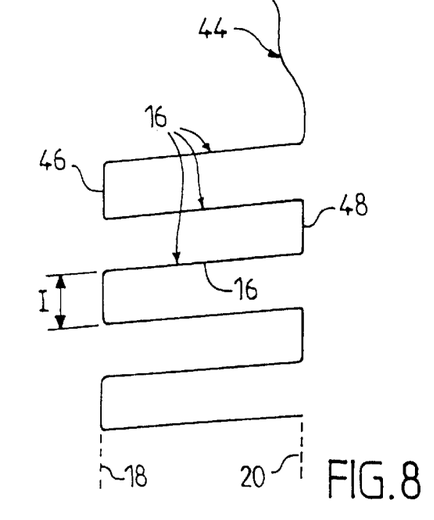
FIG. 8 is a transversely sectioned partial view of a sheet of thin material folded in an accordion or zigzag fashion.
Figure 9:
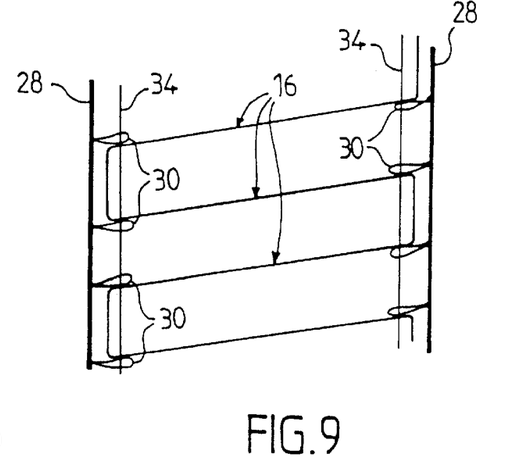
FIG. 9 is a transversely sectioned partial view of a device according to the invention of which the strips are formed making use of the folded sheet of FIG. 8.

In the embodiment of FIGS. 8 and 9 the strips 16 are formed by accordion or zigzag folding of a fabric 44 of thin material. This fabric has horizontal or inclined portions forming the strips 16 and vertical portions 46 and 48 which connect the said strips and which are placed alternately adjacent to the external face 18 and adjacent to the internal face 20 of the screen. These portions 46 and 48 constitute at the same time closure means for the air channels. The portions 46 and 48 are of a height which corresponds to the spacing I between the strips.

The device of FIGS. 8 and 9 furthermore has suspension means which could be similar to those shown in FIG. 3. These means comprise, on each side of the screen, threads 28 provided with spaced loops 30 and warp threads 34 passing through the loops 30 and the strips 16.

Figure 10:
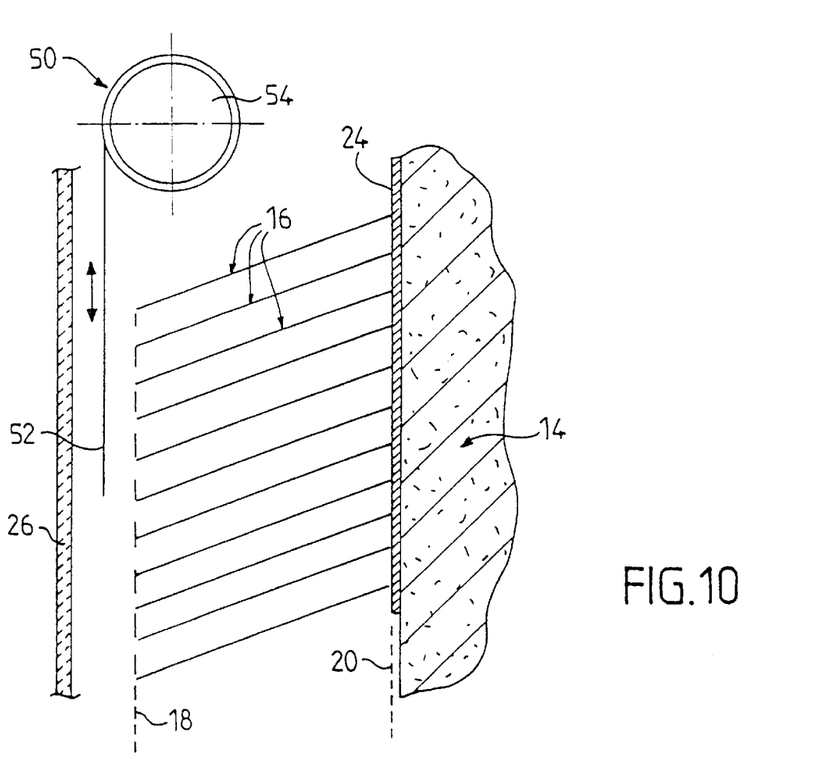
FIG. 10 is a transversely sectioned partial view of a device according to the invention including anti-solar protection means.

We now refer to FIG. 10 which shows a device similar to that of FIG. 1.

The device of FIG. 10 has in addition anti-solar protection means 50 which, in the example, comprise a blind 52 arranged vertically between the external face 18 of the screen and the glass 26. The blind is designed to roll up on a horizontal roller 54 or to unroll from the latter.

When the blind 52 is unrolled it shuts off the solar collecting device and thus renders it inoperative. It should be noted that the anti-solar protection means could equally well be utilised in a device of the type shown in FIG. 2, in which the screen is placed inside a building.

Moreover the blind 52 could be applied to all types of screen which have strips of rectilinear profile arranged inclined or where the strips have a V profile, as described in the figures which follow.

Furthermore the anti-solar protection means are open to numerous modifications. Thus in place of making use of a blind it is possible to make use of sliding elements or panels, or even fixed panels.

Figure 11:
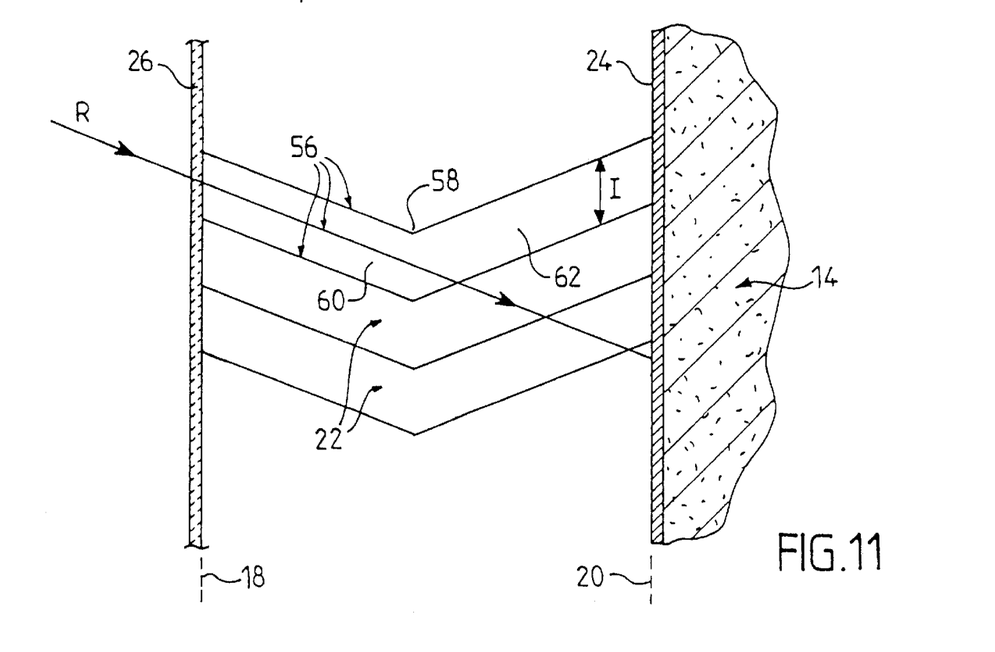
FIG. 11 is a transversely sectioned partial view of a device according to the invention used as an interior screen and formed of V-profile strips.

We now refer to FIG. 11 which shows a device analogous to that of FIG. 1 except that it has strips 56 of V profile, each having a downwardly pointing crest 58. The strips have a spacing I from one to another of reduced value. They thus define between them channels 22 which provide in turn from the external face 18 to the internal face 20 a descending portion 60 and a rising portion 62. The result is that the incident radiation R can penetrate as far as possible into the thickness of the screen while crossing the least possible amount of the strips 56, such as to allow the receiving medium 14 to absorb a large proportion of the incident solar radiation R. Furthermore the faces 18 and 20 of the screen do not mutually "see" each other, thereby achieving good insulation. In addition the V-shaped profile assists the rigidity of the strips 56.

Figure 12:
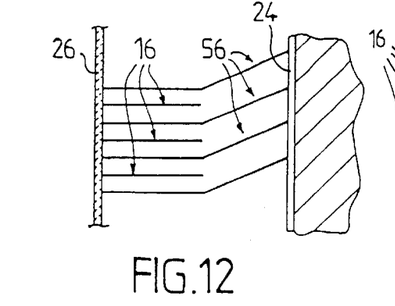
FIG. 12 is a transversely sectioned partial view of a device according to the invention having strips of rectilinear profile and strips of V profile.

In the embodiment of FIG. 12 the device comprises strips 16 of generally rectilinear profile which alternate with strips 56 of V profile. It is possible either to alternate these two types of strip rigorously or to alternate groups of several strips of generally rectilinear profile with individual strips of V profile.

Figure 13:
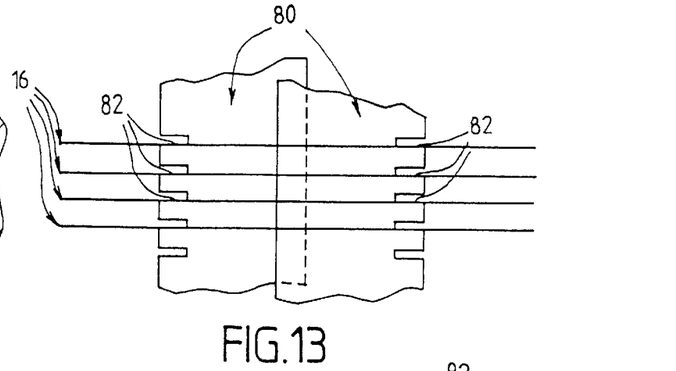
FIG. 13 is a partial view from one side of a device according to the invention using securing elements in the form of combs or of crenellations.
Figure 14:
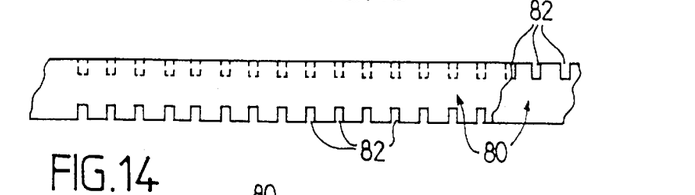
FIG. 14 is a partial view of two elements in the form of combs or of crenellations.
Figure 15:
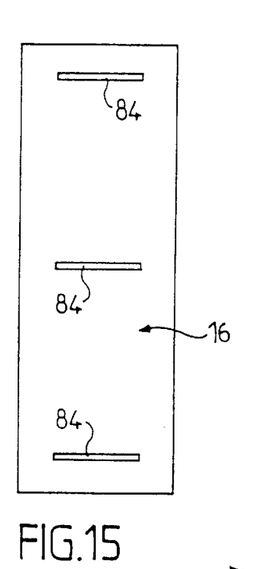
FIG. 15 is a partial view from above of a strip provided with openings of transverse shape.
Figure 16:
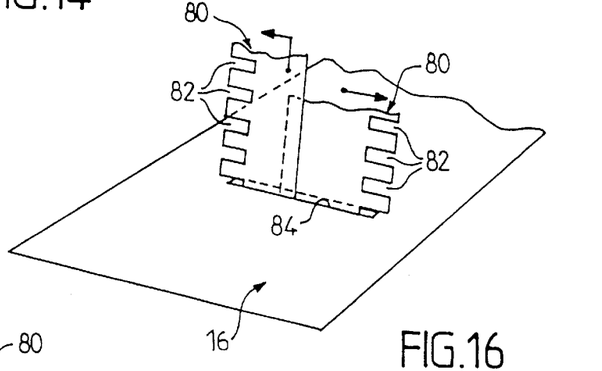
FIG. 16 is a partial perspective view of a strip according to FIG. 15 suspended by two crenellations according to FIG. 14.
Figure 17:
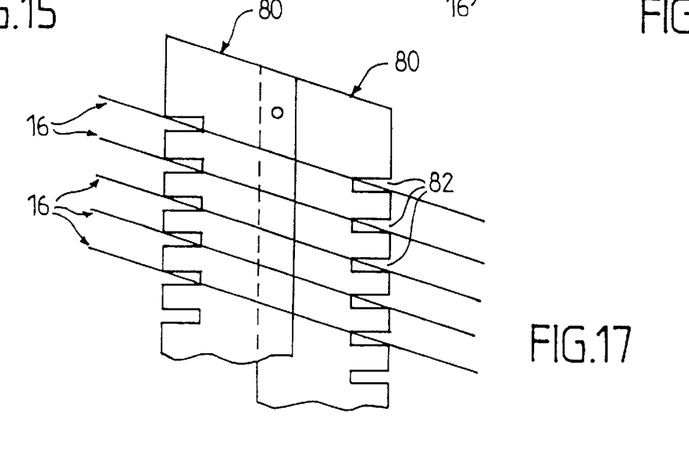
FIG. 17 is a view similar to that of FIG. 13, in which the strips are inclined.

In the embodiment of FIGS. 13 to 16 the device comprises strips 16 of rectilinear profile held in place at intervals by a pair of elements 80 in the form of combs or of crenellations having regularly spaced teeth 82. These elements 80 are introduced in pairs across transverse openings 84 in the strips 16 (FIG. 15), in a position such that the two elements of a given pair are superposed (FIG. 14), their respective teeth 82 extending in opposite directions. The two elements are subsequently separated from one another as indicated by the arrows in FIG. 16 so as to ensure that the strips 16 are held. The elements 80 could be subsequently displaced axially with respect to one another to adjust the orientation of the strips. In the case of FIG. 13 the strips are perpendicular to the axial direction of the elements 80 whereas in FIG. 17 the strips extend in an oblique direction with respect to the axial direction of the elements 80.

Figure 18:
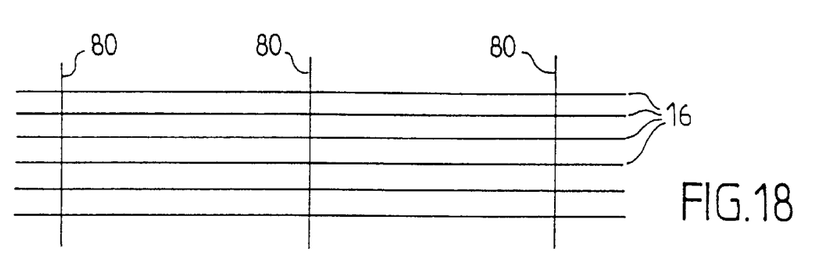
FIG. 18 is a frontal view of the device of FIG. 13.
Figure 19:
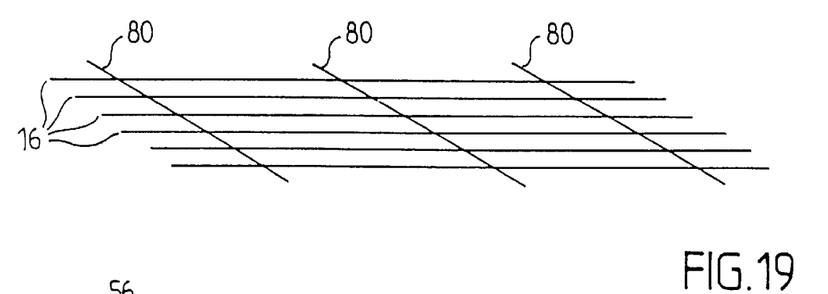
FIG. 19 is a view analogous to that of FIG. 18 showing the device in the course of being folded.

The elements 80 can be arranged in pairs beforehand in the openings 84 in the strips 16 (FIG. 18) and be subsequently folded down as shown in FIG. 19, and this facilitates the keeping of stocks. The folding can be effected up to a point at which the elements 80 are practically parallel to the strips.

The elements 80 forming combs or crenellations could be made of a transparent or translucent material, for example glass cloth.

The elements 80 are equally suitable for locating strips 16 of rectilinear profile alternating with strips 56 of V profile, as shown in FIG. 12.

Figure 20:
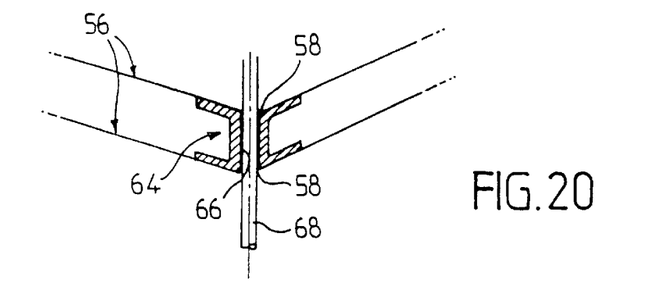
FIG. 20 is a transversely sectioned partial view of another screen with V-profile strips.

We now refer to FIG. 20 which shows another embodiment of the invention in which the strips 56 are of V profile in a substantially rigid material. The strips 56 are arranged in an alternating manner with spacers 64 in the form of pegs each arranged between the respective crests 58 of two adjacent strips 56. These spacers 64 formed by pegs each have an axial passage 66.

The strips are suspended and held spaced apart by suspension means constituted here by threads or rods 68 arranged at intervals. The rods or threads 66 are arranged at a spacing E (FIG. 21) and pass each time alternately through the crest 58 of a strip 56 and through the axial passage 66 in a spacer 64.

Figure 21:
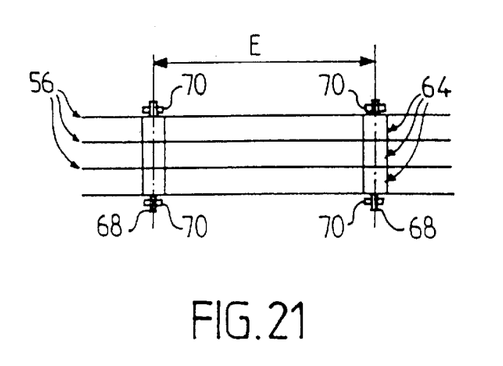
FIG. 21 is a longitudinally sectioned partial view of the device with V-profile strips according to FIG. 20.

Locking rings 70 are preferably provided for maintaining the stacked arrangement of the strips 56 and the spacers 64 (FIG. 21). The latter could be portions of tubes or portions of extruded sections.

The strips 16 or 56 could be formed by using a woven material or a non-woven material. As woven material one could advantageously use a fabric of glass fibers or even a fabric of synthetic fibers. As non-woven materials one could envisage above all a non-woven material made from glass fibers. The material constituting the strips could be used bare or could well be impregnated.

In particular it could be impregnated with a substance for improving its sealing, its transparency, its brilliance, its reflection (for example by using particles of aluminium), its solidity (so that the fibers do not slide on one another and do not break during handling), or even its durability (chemical stability).

Finally, the use of such an impregnating substance allows one to reinforce the rigidity of the strips in particular in the case where one is using a non-woven material for forming V profile strips.

Different impregnating substances could be used, in particular substances of the acrylic type and especially acrylic mousses, etc.

Figure 22:
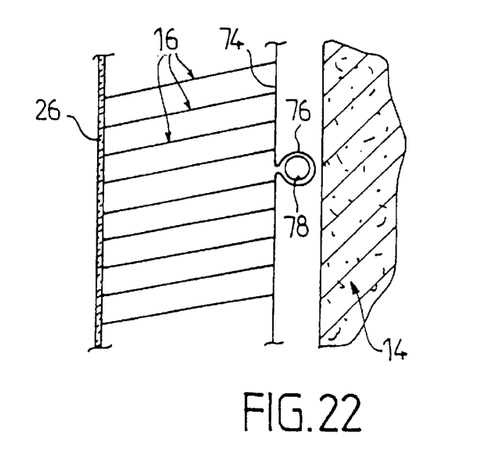
FIG. 22 is a transversely sectioned partial view of a device according to the invention used as an outside screen applied to heating a heat exchange fluid.

We now refer to FIG. 22 which constitutes another embodiment of the invention. In this variant the screen is applied against a metal sheet 74, preferably of copper, which defines recesses 76 for receiving channels 78 allowing the circulation of a heat exchange fluid. The sheet 74 is situated along a wall 14.

Thus in this particular application the device of the invention allows the heating of a heat exchange fluid circulating in the channels.

The device according to the invention thus allows the collection of solar energy and its transfer to a receiving medium, in particular to the wall of a building, while forming a good insulator with a reduced coefficient of thermal loss.

What is claimed is:

1. A device for collecting and transferring solar energy to a receiving medium to be heated, comprising:

a plurality of substantially horizontal profiled elements, spaced from one another and arranged in tiers to form a screen;

said screen having an external face designed to be exposed to solar radiation, and an internal face designed to be mounted against the receiving medium;

the plurality of profiled elements defining between them a multiplicity of air channels extending between the external face and the internal face;

and a closure device is positioned to trap the air contained in the channels;

wherein the profiled elements are made of transparent or translucent strips having low solar radiation absorption and thermal conduction properties, said strips being formed by taking a film of thin material and having a profile of which a terminating portion rises adjacent to the internal face of the screen.

2. A device according to claim 1, wherein the strips are formed of a woven or non-woven material based on mineral or synthetic fibers, in particular glass fibers, this material having a good transparency and a low retention of radiation energy.

3. A device according to claim 1, wherein the material of which the strips are formed is impregnated with a substance to improve sealing, transparency, brilliance, reflection, rigidity or durability characteristics of the strips.

4. A device according to claim 1, wherein the strips have a generally rectilinear profile arranged to be inclined with respect to a horizontal plan, in such a way that the air channels are directed in a rising direction from the external face towards the internal face of the screen.

5. A device according to claim 1, wherein the strips have a generally V shaped profile, such that the air channels are provide in a descending successive portion and a rising portion from the external face to the internal face of the screen.

6. A device according to claim 1, wherein strips have a generally rectilinear profile and/or generally V shaped profile.

7. A device according to claim 1, wherein the strips are arranged next to one another in such a way as to provide between them a spacing (I) of reduced value, at least five times smaller than the thickness (L) of the screen between the external face and internal face.

8. A device according to claim 7, wherein the spacing (I) between two consecutive strips amounts to between 6 and 20 mm for a thickness (L) of the screen of between 6 and 20 cm.

9. A device according to claim 1, wherein the strips are separate from one another and are joined together by a suspension device arranged at intervals adjacent to the external face and to the internal face of the screen.

10. A device according to claim 9, wherein the suspension device comprise a plurality of vertical threads each provided with loops having, in pairs, a spacing (I) corresponding to the spacing (I) of the strips, said loops serving as a securing arrangement for the strips.

11. A device according to claim 10, wherein each vertical thread provided with loops has associated with it a vertical warp thread which passes successively through the strips and through the loops.

12. A device according to claim 9, wherein each of the strips has two series of spaced loops formed respectively starting from two longitudinal edges of the strip, the loops of one strip passing through the loops of a strip situated immediately below.

13. A device according to claim 1, wherein the strips are formed by accordion or zigzag folding of a fabric of thin material, suspension devices being arranged at intervals adjacent to the external face and adjacent to the internal face of the screen.

14. A device according to claim 5, wherein the strips having the V-shaped profile have spacers in the form of pegs arranged in an alternating fashion with the strips in the region of a crest of the V profile, as well as suspension devices arranged at intervals and passing alternately through the strips and the spacers.

15. A device according to claim 1, further comprising a suspension device comprising at least one rigid or flexible thread of a metal, a plastics material or glass.

16. A device according to claim 1, wherein the strips are held at intervals by two securing elements in the form of combs or crenellations having regularly spaced teeth, these elements being introduced into transverse slots in the strips in such a way that the teeth extend in opposite directions and can be transversely and longitudinally adjusted to alter the orientation of the strips.

17. A device according to claim 1, wherein the closure devices are provided adjacent to the external face and/or the internal face of the screen.

18. A device according to claim 17, wherein the closure device adjacent to the internal face of the screen comprise a base plate applied in contact with or spaced from a wall.

19. A device according to claim 18, wherein the base plate is constructed as a metal sheet; a metal sheet with a selective surface; a metal film with a selective surface, stuck on to a support having in principle a mineral base; a plate with a mineral base provided with a coating which favors absorption of solar radiation.

20. A device for solar heating a medium, comprising:
- a screen further comprising;
  - an external face that can be exposed to solar radiation;
  - an internal face that can be mounted against the medium; and
  - a plurality of substantially horizontal profiled elements spaced from one another and arranged in tiers defining a plurality of air channels therebetween that extend between the external face and the internal face; and
- a closure device positioned to trap air contained in the channels; wherein
  - the profiled elements are made of substantially non-solar reflective, thin film material strips having low solar radiation absorption and thermal conduction properties, and having a profile with a terminating portion rising adjacent to the internal face of the screen.

* * * * *